Inventor
Peter John Jenkins
By Stevens, Davis, Miller & Mosher
Attorneys

_United States Patent Office_

3,546,057
Patented Dec. 8, 1970

3,546,057
REINFORCED MECHANICAL BELTING
Peter John Jenkins, Burscough, England, assignor to The Dunlop Company Limited, London, England, a British company
Filed Aug. 28, 1964, Ser. No. 392,869
Claims priority, application Great Britain, Sept. 18, 1963, 36,670/63
Int. Cl. B32b 5/12; F16g 1/12, 1/16
U.S. Cl. 161—58                                                            8 Claims

ABSTRACT OF THE DISCLOSURE

Mechanical belting comprising a flexible composition having embedded therein a reinforcement layer comprising two strips of parallel cord fabric arranged side by side in an edge to edge relationship. The cords of each strip are biased with respect to the longitudinal axis of the belting in opposite senses so that the cords of the two strips are arranged in a herringbone configuration.

---

Figure 1:
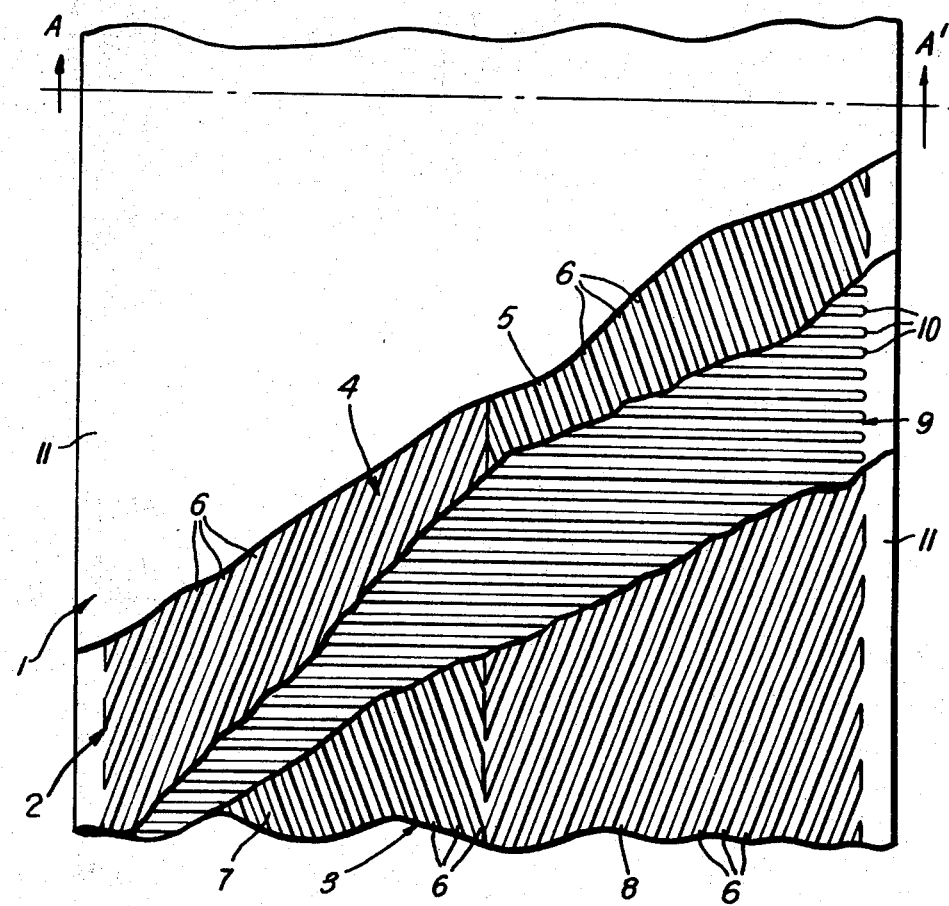

The present invention relates to reinforced mechanical belting comprising a flexible composition having a reinforcement of steel or the like substantially inextensible cords, and is an improvement in or modification of the invention described in our co-pending application Ser. No. 392,237, filed Aug. 26, 1964.

In co-pending application Ser. No. 392,237 there is described and claimed reinforced mechanical belting which comprises a reinforcement of substantially inextensible cords embedded in a flexible composition, said reinforcement comprising at least two layers of cords in which the cords are in substantially parallel side by side relationship, the cords in each layer being biased with respect to the longitudinal axis of the belting at an angle of from 5° to 40°, and the bias angle of the cords of one layer being in the opposite sense to the bias angle of the cords in an adjacent layer.

According to the present invention a reinforced mechanical belt comprises a reinforcement embedded in a flexible composition, said reinforcement comprising at least one reinforcement layer being two sheets arranged in side by side relationship, each of said sheets being made of substantially inextensible cords arranged in side by side relationship and biased with respect to the longitudinal axis of the belting at an angle of from 5° to 40°, the bias angle of the substantially inextensible cords of one sheet being in the opposite sense to the bias angle of the substantially inextensible cords of the other sheet so that in the reinforcement layer the substantially inextensible cords are arranged in a herring-bone configuration, and at least one binding layer superimposed on the reinforcement layer for at least a short distance each side of the junction between the two sheets which form the reinforcement layer.

The substantially inextensible cords, such as steel cords, which form the sheets of a reinforcement layer are biased with respect to the longitudinal axis of the belting at an angle of between 5° and 40°, preferably between 15° and 30°.

The binding layer can be a sheet of substantially inextensible cords, such as steel cords, in which the cords are arranged in side by side relationship and biased with respect to the longitudinal axis of the belting at an angle of from 5° to 90°, preferably greater than 15°. The binding layer extends longitudinally throughout the belting and is superimposed on the reinforcement layer for at least a short distance each side of the junction between the two sheets of substantially inextensible cords which form the reinforcement layer. Usually, the binding layer is of a width greater than half the width of the reinforcement layer and in this case the binding layer preferably extends from one edge of the reinforcement layer.

The sheets of substantially inextensible cords which form a reinforcement layer can have a width substantially equal to half the width of a reinforcement layer and extend longitudinally throughout the belting. Alternatively, one of the sheets may have a width greater than the other sheet. The sheets are arranged in side by side relationship preferably with adjacent edges in contact so that a complete reinforcement layer extends longitudinally throughout the belting.

The reinforcement contains at least one reinforcement layer and may contain two or more such layers, an even number of layers being preferred. In the case where the reinforcement contains more than one reinforcement layer, then the reinforcement layers are arranged so that the herring-bone configuration of one reinforcement layer is in the opposite sense to the herring-bone configuration of an adjacent reinforcement layer, i.e., the substantially inextensible cords of one sheet of one reinforcement layer cross the substantially inextensible cords of the corresponding sheet of an adjacent reinforcement layer at an angle equal to the sum of the bias angles of the substantially inextensible cords of the respective sheets.

Usually the reinforcement contains two reinforcement layers in which the bias angle of the substantially inextensible cords of each sheet of each reinforcement layer is the same. In such a case, the upper reinforcement layer is of the same configuration as the lower reinforcement layer but is turned through 180° with respect to said lower reinforcement layer, so that the herring-bone configurations of the two layers are opposed.

If the reinforcement contains more than one reinforcement layer, then a binding layer is interposed between adjacent reinforcement layers to join together the sheets of cords forming said layers. In such a case, the binding layer may be a sheet of substantially inextensible cords, such as steel cords, in which the cords are biased with respect to the longitudinal axis of the belting at an angle of 90°, i.e., the substantially inextensible cords of the binding layer extend transversely of the belting, and the binding layer preferably has a width equal to the width of a reinforcement layer.

Alternatively, the reinforcement may comprise a single reinforcement layer, and in this case, a binding layer may be superimposed on one or both of the surfaces of the reinforcement layer. The binding layer extends longitudinally throughout the belting and may have a width greater than half the width of the reinforcement layer. The binding layer preferably has a width greater than half the width of the reinforcement layer and extends from one edge of the reinforcement layer in which case the binding layer is made of substantially inextensible cords, such as steel cords, in which the cords are arranged in side by side relationship and biased with respect to the longitudinal axis of the belting at an angle of from 5° to 90°, preferably at least 10°. The angle of bias of the substantially inextensible cords of the binding layer should preferably be the same as the angle of bias of the substantially inextensible cords which form the sheets of the reinforcement layer. The binding layer is superimposed on the reinforcement layer in such a way that the angle of bias of the substantially inextensible cords of the binding layer is in the opposite sense to the angle of bias of the substantially inextensible cords of the sheet upon which the binding layer is superimposed, i.e., the substantially inextensible cords of the binding layer cross the substantially inextensible cords of the sheet of the reinforcement layer at an angle equal to the sum of the respective bias angles.

A second binding layer of width substantially the same as the width of the first binding layer referred to in the immediately preceding paragraph may be superimposed on the opposite surface of the reinforcement layer and extending from the edge of the reinforcement layer opposite the edge from which the first binding layer extends. This second binding layer may be made of substantially inextensible cords, such as steel cords, which cords are arranged in side by side relationship and biased with respect to the longitudinal axis of the belting, the bias angle of the cords of the second binding layer being in the opposite sense to the bias angle of the cords of the first binding layer. Alternatively, and preferably, the second binding layer is superimposed on the same surface of the reinforcement layers as is the first binding layer. In this case, the second binding layer extends from the edge of the reinforcement layer opposite the edge from which the first binding layer extends. Again, the bias angle of the substantially inextensible cords of the second binding layer should be in the opposite sense to the bias angle of the substantially inextensible cords of the first binding layer.

The flexible composition in which the reinforcement is embedded can be a natural or synthetic rubber composition, or a synthetic resin composition such as a plasticized polyvinyl chloride composition.

The reinforced mechanical belting according to the present invention may have castellations at each end to enable adjacent ends to be connected. Suitable castellations are described in our co-pending application 392,237. Such belting comprises a segment member or members having castellated ends, the castellations comprising rigid ferrules enclosed by steel cords the ends of which extend a short distance into the segment members and enclose, or are enclosed by the ends of reinforcement layers which extend longitudinally throughout the segment member.

Figure 2:
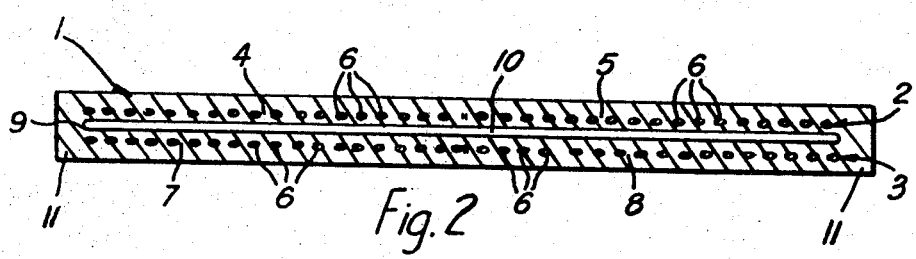
Figure 3:
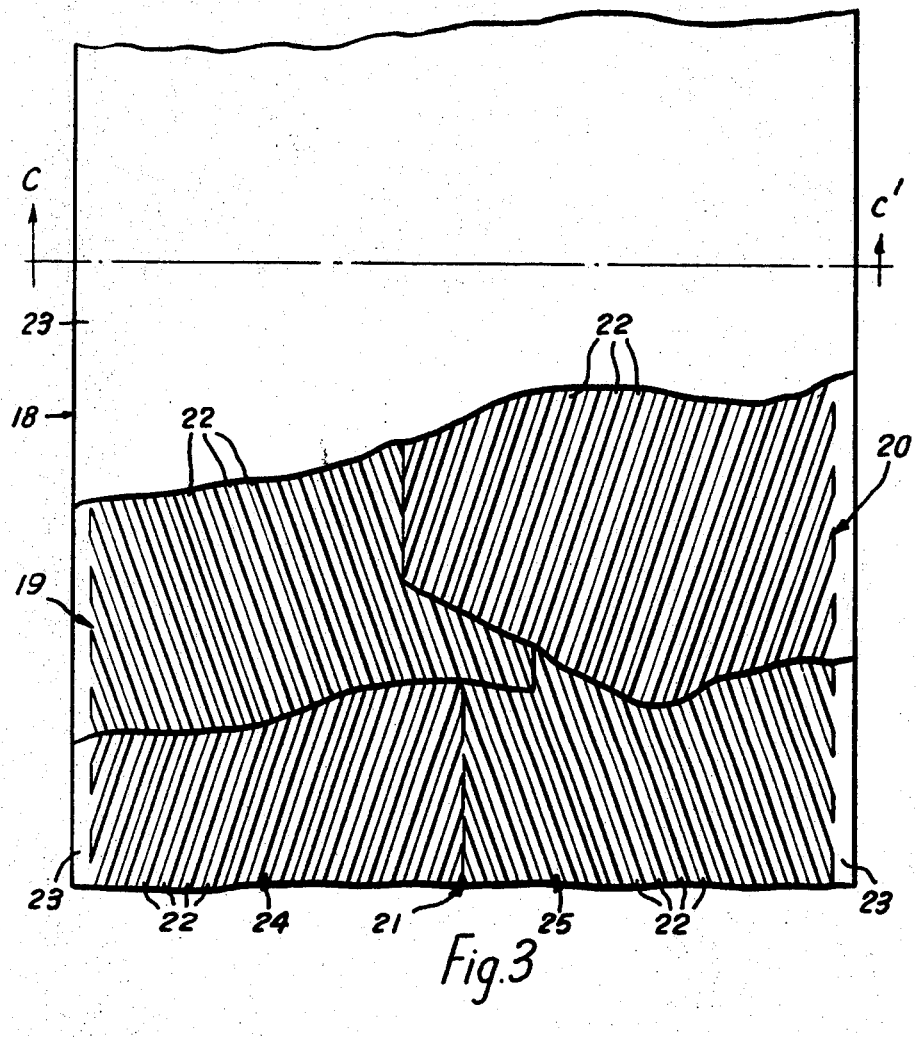
Figure 4:
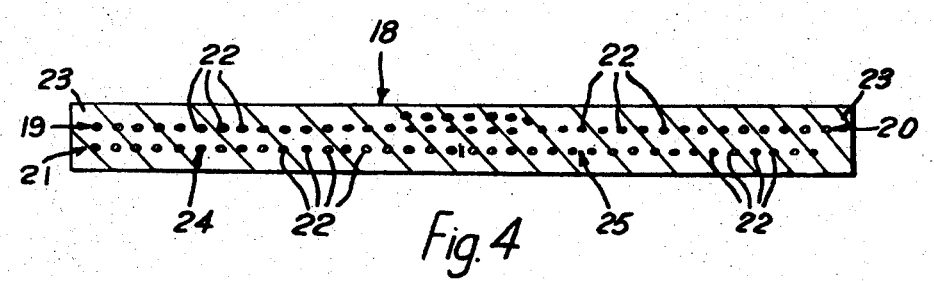
Figure 5:
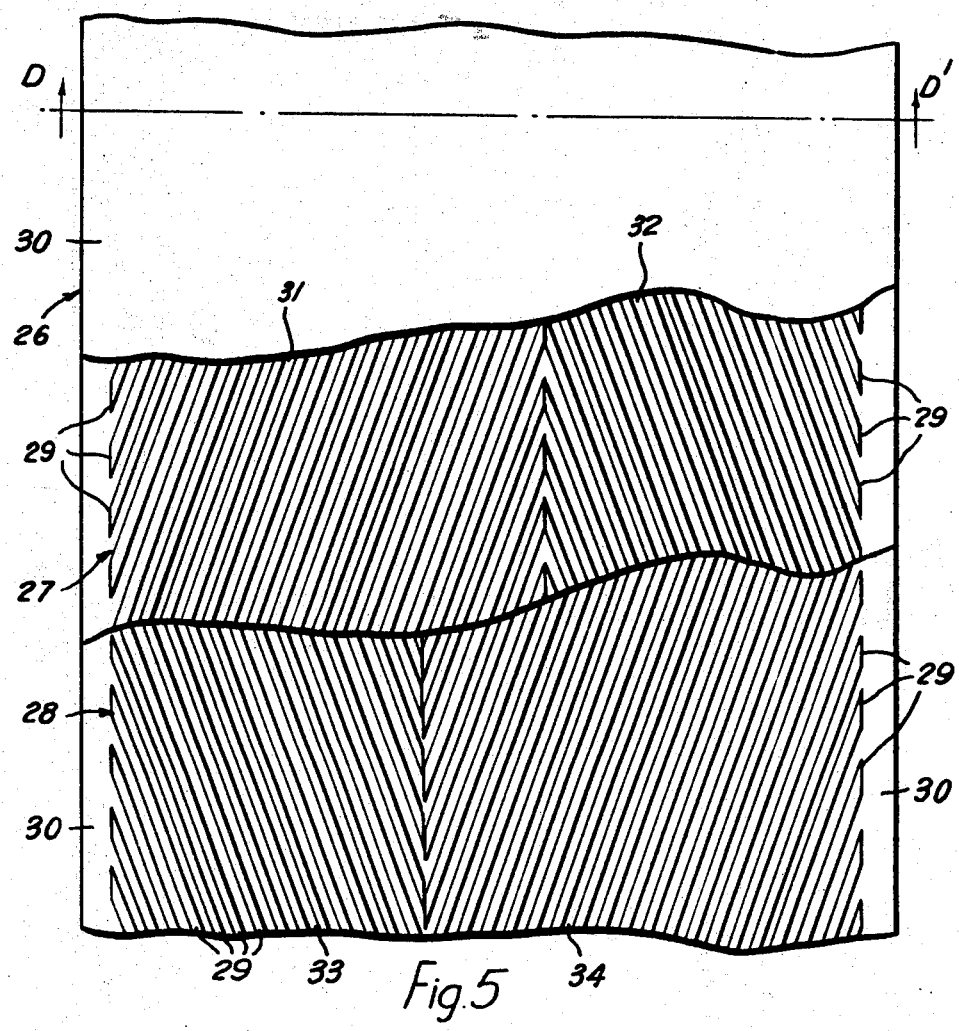
Figure 6:
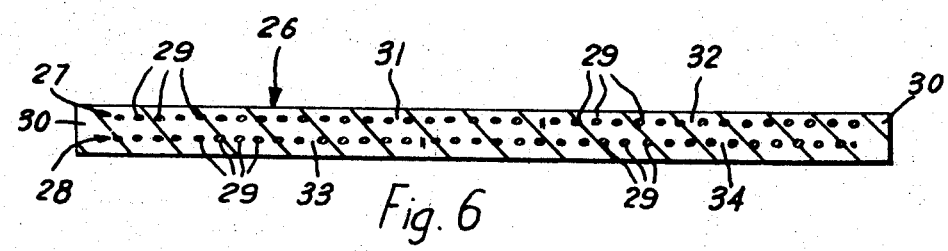

Several forms of reinforced mechanical belting constructed in accordance with the present invention, will now be described by way of example only with reference to the accompanying drawings in which:

FIG. 1 shows a plan view of a belt constructed in accordance with the present invention with various parts cut away to show the construction in detail, FIG. 2 shows a cross-section through the belt taken along the line AA' of FIG. 1, FIG. 3 shows a plan view of an alternative form of belt with various parts cut away to show the construction in detail, FIG. 4 shows a cross-section through the belt taken along the line CC' of FIG. 3, FIG. 5 shows a plan view of another form of belt with various parts cut away to show the construction in detail, and, FIG. 6 shows a cross-section taken along the line DD' of FIG. 5.

The reinforced mechanical belt 1 shown in FIGS. 1 and 2 contains two longitudinally extending reinforcement layers 2 and 3. The reinforcement layer 2 consists of two sheets 4 and 5 of rubber coated steel cords 6, the sheets 4 and 5 being arranged in side by side relationship. The reinforcement layer 3 consists of two sheets 7 and 8 of rubber coated steel cords 6. Each of the sheets 4, 5, 6 and 7 is of a width equal to half the width of the reinforcement layers 2 and 3 and consists of rubber-coated steel cords 6 in which the cords are arranged in side by side relationship and biased with respect to the longitudinal axis of the belt at an angle of 15°. The bias angle of the cords 6 of sheet 4 is in the opposite sense to the bias angle of the cords 6 of the sheet 5 so that the cords in the reinforcement layer 2 are in a herring-bone configuration. The reinforcement layers 2 and 3 are arranged so that the layer 2 is turned through 180° with respect to the layer 3, i.e. the herring-bone configuration of the layer 2 opposes the herring-bone configuration of the layer 3. A binding layer 9 of rubber-coated steel cords 10 is interposed between the two reinforcement layers 2 and 3. The binding layer 9 extends longitudinally of the belt and has a width substantially equal to the width of the reinforcement layers 2 and 3, and consists of rubber-coated steel cords 10 arranged in side by side relationship and biased with respect to the longitudinal axis of the belt at an angle of 90°, i.e., the cords of the binding layer 9 extend transversely of the belt at right angles to the longitudinal axis of the belt. The reinforcement is embedded in a vulcanized rubber composition, 11.

In manufacturing the belt, two sheets 4 and 5 of rubber-coated steel cords 6 (9 x 0.0058" zinc plated steel wire), in which the cords 6 are arranged in side-by-side relationship and biased with respect to the longitudinal axis of the belt at an angle of 15°, are laid in side-by-side relationship to form the reinforcement layer 2, in such a way that the bias angle of the cords 6 of the sheet 4 is in the opposite sense to the bias angle of the cords 6 of the sheet 3, i.e. the cords are arranged in a herring-bone configuration. A sheet 9 of rubber-coated steel cords 10 (9 x 0.0058" zinc plated steel wire) of width equal to the width of the reinforcement layer 2 and in which the cords 10 are biased with respect to the longitudinal axis of the belt at an angle of 90° is laid on the reinforcement layer 2 to provide a binding layer. A second reinforcement layer 3 is produced on this sheet 9 as described for the first reinforcement layer 2, but in such a manner that the herring-bone configuration of the reinforcement layer 3 is turned through 180° with respect to the herring-bone configuration of the reinforcement layer 2. The assembly is then covered with sheets of a vulcanizable rubber composition 11. The belting so formed is subjected to heat and pressure to vulcanize the vulcanizable rubber composition 11 and to consolidate the belting.

The belt 18 shown in FIGS. 3 and 4 consists of three plies 19, 20 and 21 of steel cords 22, embedded in a vulcanized rubber composition 23. The ply 21 of steel cords 22 has a width slightly less than the width of the belt and consists of two sheets 24 and 25 of cords 22, the sheets 24 and 25 each having a width equal to half the width of the ply 22. The sheets 24 and 25 are arranged in side-by-side relationship to form the ply 21 and the plies 19 and 20 arranged both on the same side of the ply 21. The plies 19 and 20 each has a width of the sheets 24 and 25, and extend one from each edge of the ply 21, so that the ply 20 overlaps the ply 19 in the central region of the belt.

The belt 26 shown in FIGS. 5 and 6 consists of two layers 27 and 28 of steel cords 29 embedded in a vulcanized rubber composition 30. The layer 27 consists of two sheets 31 and 32 of the steel cords 29, the sheets 31 and 32 being arranged in side-by-side relationship to form the layer 27. The width of the sheet 31 is slightly greater than half the width of the layer 27 and the sheet 32 has a width slightly less than half the width of the layer 27. The layer 28 is similarly constructed of sheets 33 and 34 of the steel cords 29, the sheet 34 being wider than the sheet 33. In the layer 27 the steel cords 29 are biased at an angle of 15° with respect to the longitudinal axis of the belt, the cords 29 of the sheet 31 being biased in the opposite sense to the cords 29 in the sheet 32 so that the cords 29 in the layer 27 are in a herring-bone configuration. The cords 29 in the layer 28 are similarly arranged in a herring-bone configuration, and the layers 27 and 28 are arranged so that the herring-bone configuration of the layer 27 is opposed to the herring-bone configuration of the layer 28.

Having now described my invention, what I claim is:

1. Mechanical belting comprising a flexible composition and a reinforcement layer embedded in the flexible composition, the reinforcement layer comprising two strips of reinforcement material arranged side by side in an edge-to-edge relationship, each strip of reinforcement material comprising an assembly of parallel cords biased with respect to the longitudinal axis of the belting, the bias angle of the cords of one strip being in the opposite sense to the bias angle of the cords of the other strip so that the cords of the two strips together are arranged in a herringbone configuration.

2. Mechanical belting according to claim 1 wherein the cords of the strips of reinforcement material are biased at an angle between 5° and 40° with respect to the longitudinal axis of the belting.

3. Mechanical belting according to claim 1 wherein the cords of the strips of reinforcement material are biased at an angle between 15° and 30° with respect to the longitudinal axis of the belting.

4. Mechanical belting according to claim 1 wherein the width of each of the strips of reinforcement material is substantially equal to one-half the width of the reinforcement layer.

5. Mechanical belting according to claim 1 further comprising a longitudinally extending binding layer arranged in superimposed relation to the strips of reinforcement material, and extending transversely across the confronting edges of the strips.

6. Mechanical belting according to claim 5 wherein the binding layer comprises an assembly of parallel cords biased at an angle between 5° and 90° with respect to the longitudinal axis of the belting.

7. Mechanical belting according to claim 5 comprising two longitudinally extending binding layers arranged in superimposed relation to the strips of reinforcement material and extending transversely across the confronting edges of the strips, the width of each binding layer being greater than half the width of the reinforcement layer, the binding layers being arranged so that one longitudinally extending edge of one binding layer is positioned adjacent one longitudinally extending side edge of the reinforcement layer, and one longitudinally extending edge of the other binding layer is positioned adjacent the other longitudinally extending side edge of the reinforcement layer.

8. Mechanical belting comprising a flexible composition, a first reinforcement layer embedded in the flexible composition, and a second reinforcement layer embedded in the flexible composition, said first and said second layers each comprising two strips of reinforcement material arranged side by side in an edge-to-edge relationship, each strip of reinforcement material comprising an assembly of parallel cords biased with respect to the longitudinal axis of the belting, the bias angle of the cords of one strip being in the opposite sense to the bias angle of the cords of the other strip, so that the cords of the two strips together are arranged in a herringbone configuration, the herringbone configuration of the first layer being opposed to the herringbone configuration of the second layer.

References Cited

UNITED STATES PATENTS

| | | | |
|---|---|---|---|
| 2,377,650 | 6/1945 | Reimel | 161—58 |
| 2,842,472 | 7/1958 | Hartstein | 161—58 |
| 3,212,627 | 10/1965 | Beebee | 198—193 |
| 3,297,513 | 1/1967 | Robinson | 161—57 |
| 3,298,417 | 1/1967 | Keefe | 152—330 |

FOREIGN PATENTS

| | | | |
|---|---|---|---|
| 12,860 | 10/1908 | Great Britain | 161—58 |
| 13,430 | 2/1909 | Great Britain | 161—58 |

ROBERT F. BURNETT, Primary Examiner

W. A. POWELL, Assistant Examiner

U.S. Cl. X.R.

74—232; 156—304; 161—144